US012584936B2

(12) United States Patent  (10) Patent No.: US 12,584,936 B2
Gysel et al.  (45) Date of Patent: Mar. 24, 2026

(54) PIPETTING UNIT WITH CAPACITIVE LIQUID DETECTION, COMBINATION OF SUCH A PIPETTING UNIT AND A PIPETTING TIP, AND METHOD FOR CAPACITIVELY DETECTING PIPETTING LIQUID

(71) Applicant: HAMILTON BONADUZ AG, Bonaduz (CH)

(72) Inventors: Fridolin Gysel, Zwängiweg (CH); Reto Ettinger, Uster (CH); Silvio Walpen, Thalwil (CH)

(73) Assignee: HAMILTON BONADUZ AG, Bonaduz (CH)

( * ) Notice: Subject to any disclaimer, the term of this patent is extended or adjusted under 35 U.S.C. 154(b) by 799 days.

(21) Appl. No.: 17/784,536

(22) PCT Filed: Dec. 11, 2020

(86) PCT No.: PCT/EP2020/085764
§ 371 (c)(1),
(2) Date: Feb. 13, 2023

(87) PCT Pub. No.: WO2021/116408
PCT Pub. Date: Jun. 17, 2021

(65) Prior Publication Data
US 2023/0168267 A1     Jun. 1, 2023

(30) Foreign Application Priority Data
Dec. 12, 2019     (DE) ..................... 10 2019 134 200.7

(51) Int. Cl.
G01N 35/10     (2006.01)
G01F 11/02     (2006.01)
G01F 23/263     (2022.01)

(52) U.S. Cl.
CPC ....... G01N 35/1016 (2013.01); G01F 11/029 (2013.01); G01F 23/265 (2013.01);
(Continued)

(58) Field of Classification Search
CPC .......................... G01N 35/1016; G01F 11/029
(Continued)

(56) References Cited

U.S. PATENT DOCUMENTS 3,261,509 A * 7/1966 Shevell ................. B01L 3/0224
222/340
3,853,012 A * 12/1974 Scordato ............... C01B 17/907
422/922
(Continued)

FOREIGN PATENT DOCUMENTS

DE     197 56 842 A1     5/1999
DE     10 2009 049 783 A1     4/2011
(Continued)

OTHER PUBLICATIONS

Vinzenz et al (Year: 2014).*
(Continued)

*Primary Examiner* — Peter J Macchiarolo
*Assistant Examiner* — Rodney T Frank
(74) *Attorney, Agent, or Firm* — Wiggin and Dana LLP

(57) ABSTRACT

A pipetting unit (2) with capacitive liquid detection comprises: a pressure tube (10); a shield (12) disposed around the pressure tube (10); a coupling (14) for temporarily attaching a pipetting tip (4) to the pipetting unit (2), wherein when the pipetting tip (4) is connected, an electrical connection is established between the pressure tube (10) and the pipetting tip (4); and an electric circuit (20) coupled to the pressure tube (10) and the shield (12), wherein the electric circuit (20) is configured to apply a time-variable electrical signal to the pressure tube (10), said time-variable electrical
(Continued)

signal permitting a capacitive detection of a contact between the pipetting tip (4) and a pipetting liquid (112) when the pipetting tip (4) is connected, and wherein the electric circuit (20) is configured to connect the shield (12) to ground.

18 Claims, 4 Drawing Sheets

(52) U.S. Cl.
CPC ................ *G01N 2035/1025* (2013.01); *G01N 2035/103* (2013.01)

(58) Field of Classification Search
USPC ....................................................... 73/864.18
See application file for complete search history.

(56) References Cited

U.S. PATENT DOCUMENTS

| | | | | |
|---|---|---|---|---|
| 3,918,308 | A | * | 11/1975 | Reed ...................... B01L 3/0217 |
| | | | | 422/923 |
| 5,090,255 | A | * | 2/1992 | Kenney ................. B01L 3/0227 |
| | | | | 73/864.18 |
| 5,270,210 | A | * | 12/1993 | Weyrauch ............. G01F 23/266 |
| | | | | 422/67 |
| 5,304,347 | A | | 4/1994 | Mann et al. |
| 5,855,851 | A | | 1/1999 | Matsubara et al. |
| 6,299,841 | B1 | * | 10/2001 | Rainin .................. B01L 3/0227 |
| | | | | 73/864.18 |
| 6,551,558 | B1 | | 4/2003 | Mann et al. |
| 7,191,647 | B2 | | 3/2007 | Harazin et al. |
| 9,346,045 | B2 | | 5/2016 | Blumentritt et al. |
| 10,272,425 | B2 | | 4/2019 | Guzman et al. |
| 2006/0093525 | A1 | * | 5/2006 | Brunner ............. G01N 35/1011 |
| | | | | 422/63 |
| 2006/0127281 | A1 | * | 6/2006 | Bjornson ........... G01N 35/1009 |
| | | | | 422/417 |
| 2006/0233669 | A1 | | 10/2006 | Panzer |
| 2009/0000350 | A1 | * | 1/2009 | Magnussen ........... B01L 3/0237 |
| | | | | 73/864.18 |
| 2012/0024055 | A1 | * | 2/2012 | Knight .................. G01F 23/263 |
| | | | | 73/304 C |
| 2012/0114526 | A1 | | 5/2012 | Watanabe et al. |
| 2018/0099270 | A1 | * | 4/2018 | Petrek .................. B01L 3/0217 |
| 2020/0298225 | A1 | * | 9/2020 | Romer .................. G01N 35/04 |
| 2020/0298242 | A1 | | 9/2020 | Romer et al. |
| 2020/0360916 | A1 | * | 11/2020 | Walpen ................. B01L 3/0217 |

FOREIGN PATENT DOCUMENTS

| | | | |
|---|---|---|---|
| DE | 10 2017 201 114 | A1 | 7/2018 |
| DE | 10 2017 220 042 | A1 | 5/2019 |
| DE | 10 2017 220 892 | A1 | 5/2019 |
| EP | 0 555 710 | A2 | 8/1993 |
| EP | 0819942 | A2 | 1/1998 |
| EP | 1171240 | B2 | 6/2006 |
| EP | 2230521 | A2 | 9/2010 |
| EP | 2 270 445 | A1 | 5/2011 |
| EP | 2869030 | A1 | 5/2015 |
| EP | 3455596 | A1 | 3/2019 |
| EP | 3501654 | A1 | 6/2019 |
| WO | WO-2014027100 | A1 * | 2/2014 ........... H01F 7/1607 |
| WO | 2019/011698 | A1 | 1/2019 |

OTHER PUBLICATIONS

Texas Instruments datasheet: FDC2x1x EMI-Resistant 28-Bit, 12-Bit Capacitance-to-Digital Converter for Proximity and Level Sensing Applications.

* cited by examiner

_Fig. 2_
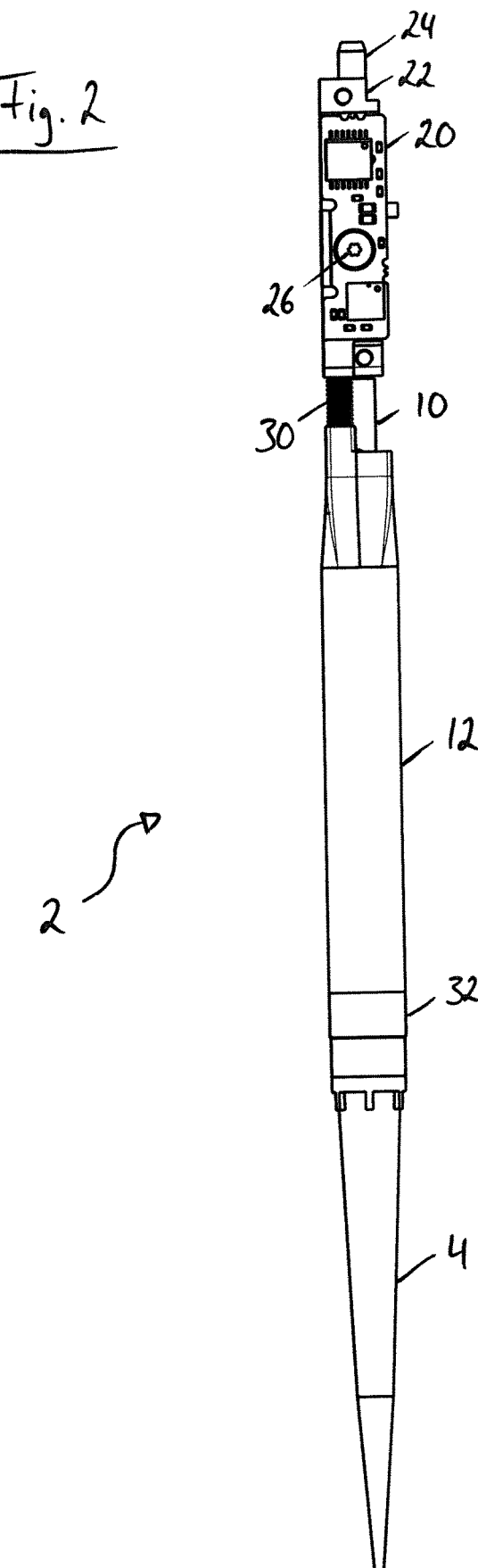
24
22
20
26
30
10
2
12
32
4

$Fig. 3$

PIPETTING UNIT WITH CAPACITIVE LIQUID DETECTION, COMBINATION OF SUCH A PIPETTING UNIT AND A PIPETTING TIP, AND METHOD FOR CAPACITIVELY DETECTING PIPETTING LIQUID

CROSS-REFERENCE TO RELATED APPLICATIONS

This application is a national phase entry under 35 U.S.C. § 371 of International Application number PCT/EP2020/085764, filed Dec. 11, 2020, which claims priority to German Patent Application No. 10 2019 134 200.7, filed Dec. 12, 2019, all of which are herein incorporated by reference in their entireties.

BACKGROUND

The present invention is in the field of pipetting systems and components thereof. In particular, the present invention relates to pipetting systems in which pipetting liquid is aspirated or dispensed and in which the contact between the pipetting tip and the pipetting liquid can be detected.

Modern pipetting systems are highly complex technical systems. They are designed to aspirate and dispense very small quantities of pipetting liquid at high speed and with high accuracy. This often involves a large number of pipetting tips arranged in a grid pattern to perform a large number of pipetting operations simultaneously. To achieve high accuracy, there have been approaches in the past to detect the filling level of the pipetting liquid in a container and to match the pipetting operation to the filling level in the container, from which to aspirate or into which to dispense. However, the previous approaches are not satisfactory in all respects.

Accordingly, it would be desirable to provide a pipetting unit with liquid detection and a method for detecting pipetting liquid that enable effective and reliable detection of the pipetting liquid.

BRIEF SUMMARY

Exemplary embodiments of the invention include a pipetting unit with capacitive liquid detection, comprising a pressure tube; a shield disposed around the pressure tube; a coupling for temporarily attaching a pipetting tip to the pipetting unit, wherein an electrical connection is established between the pressure tube and the pipetting tip when the pipetting tip is connected; and an electric circuit coupled to the pressure tube and the shield, wherein the electric circuit is configured to apply a time-variable electrical signal to the pressure tube, said time-variable electrical signal permitting a capacitive detection of a contact between the pipetting tip and a pipetting liquid when the pipetting tip is connected, and wherein the electric circuit is configured to connect the shield to ground.

Exemplary embodiments of the invention allow for an effective and reliable detection of a contact between the pipetting tip and the pipetting liquid in the pipetting unit. By applying a time-variable electrical signal to the pressure tube and by way of the electrical connection between the pressure tube and the pipetting tip, an abrupt change in capacitance between the pipetting tip and the liquid to be pipetted, as occurs when the pipetting tip contacts the pipetting liquid, can be effectively detected. Furthermore, due to the fact that the shield, which is arranged around the pressure tube, is connected to ground, the time-variable electrical signal can be made available largely free from interference effects. In particular, the pressure tube and the shield can carry the time-variable electrical signal according to the principle of a coaxial cable, whereby strong decoupling from interference effects, such as electromagnetic interference from the surroundings and/or parasitic capacitances, can be achieved. As the electric circuit both applies the time-variable electrical signal to the pressure tube and provides the ground connection for the shield, a particularly well-defined signal transmission environment for the time-variable electrical signal and particularly good shielding of the time-variable electrical signal can be achieved. The capacitive detection of the contact between the pipetting tip and the pipetting liquid is thus possible in particularly reliable manner.

In the pipetting unit, the capacitive liquid detection is performed by capacitive detection of the contact between the pipetting tip and the pipetting liquid. During a vertical movement of the pipetting tip, as is common when aspirating or dispensing pipetting liquid, the filling level in a container, from which pipetting liquid is to be aspirated or into which pipetting liquid is to be dispensed, is thus detected. A well-defined immersion depth of the pipetting tip into the pipetting liquid can be achieved, which may in turn lead to a high accuracy of the aspirated or dispensed liquid volume and/or which may minimize or reduce the contamination of the pipetting tip with the liquid, into which the pipetting tip is immersed, to a low level. The container with pipetting liquid may be any suitable container for pipetting liquid, with which the pipetting unit and pipetting tip can work. In particular, grounded and/or non-electrically conductive containers are suitable. In the field of laboratory automation, so-called labware is frequently used, in which a large number of indentations, so-called wells, are provided in carrier-shaped or tray-shaped structures for holding pipetting liquid.

The pipetting unit has a coupling for temporarily attaching a pipetting tip to the pipetting unit. The pipetting tip may be a disposable pipetting tip. In this case, the pipetting tip may actually be used only for a single aspiration and dispensing operation. However, it is also possible for the pipetting tip to be used for a plurality of aspiration and dispensing operations before being discarded. The coupling may be such that, when the pipetting tip is connected, a substantially gas-tight connection is formed between the pressure tube and the pipetting tip. Thus, a substantially sealed volume of compressed air can be formed in the pressure tube and the pipetting tip, with the exception of the pipetting tip opening. In pipetting systems that control aspiration or dispensing via compressed air in the pressure tube, the substantially gas-tight connection between the pressure tube and the pipetting tip allows for a highly accurate control of the volume of liquid to be aspirated or dispensed.

An electric motor, in particular an electric linear motor, may be connected to the pipetting unit. The electric linear motor may have a movable piston, by which pressure changes in the pressure tube and the connected pipetting tip can be achieved for aspirating or dispensing the pipetting liquid. The electric motor may be replaceably connected to the pressure tube or may be integral with the pressure tube and thus with the pipetting unit. The controller of the electric motor can be coupled to the electric circuit of the pipetting unit, so that the controller of the electric motor can perform the aspiration process or dispensing process depending on the capacitive detection of the contact between the pipetting tip and the pipetting liquid.

The electric circuit is configured to apply a time-variable electrical signal to the pressure tube and to connect the shield to ground. Both the pressure tube and the shield are electrically conductive. In this way, the time-variable electrical signal and the ground potential can be applied along the pressure tube and along the shield, respectively. The pressure tube and the shield are at least partially made of electrically conductive material. It is possible that the pressure tube and/or the shield are completely or substantially completely made of electrically conductive material.

When the pipetting tip is connected, there is an electrical connection established between the pressure tube and the pipetting tip. In other words, the coupling between the pipetting tip and the pipetting unit is such that, when the pipetting tip is connected, an electrical connection is established between the pressure tube and the pipetting tip. For this purpose, the coupling may be at least partially conductive, so that the electrical connection exists via one or more components of the coupling. It is also possible that the coupling is designed such that a direct contact between the pipetting tip and the pressure tube is present at at least one location, so that an electrical connection exists via this direct contact.

The coupling is designed for temporarily attaching a pipetting tip to the pipetting unit. The pipetting tip is in particular an electrically conductive pipetting tip. Thus, the time-variable electrical signal can be applied to the pipetting tip via the pressure tube and the electrical connection between the pressure tube and the pipetting tip, in particular applied along the pipetting tip up to the pipetting tip opening. In this case, the contact between the pipetting tip and the pipetting liquid can have an immediate effect on the time-variable electrical signal, which can be reliably detected.

The electric circuit is configured to apply the time-variable electrical signal to the pressure tube and to connect the shield to ground. In particular, the electric circuit may be configured to generate the time-variable electrical signal and to apply the same to the pressure tube. Further, the electric circuit may be configured to perform the capacitive detection of the contact between the pipetting tip and the pipetting liquid when the time-variable electrical signal is applied to the pressure tube, i.e. during or after the application of the time-variable electrical signal to the pressure tube. For this purpose, the electric circuit may be configured to detect the electrical behavior of the pressure tube, the pipetting tip and the coupling, when the time-variable electrical signal is applied, and to derive the presence of a contact or no contact between the pipetting tip and the pipetting liquid therefrom. Due to the abrupt change in capacitance between the pipetting tip and the surroundings, in particular between the pipetting tip and the container filled with pipetting liquid, when the pipetting tip and the pipetting liquid come into contact, the electrical behavior in response to the time-variable electrical signal also changes abruptly. By detecting and analyzing the response of the system excited by the time-variable electrical signal, the electric circuit can detect the contact between the pipetting tip and the pipetting liquid. The electric circuit may be configured as an electric circuit for signal generation and application on the one hand, and signal reception and processing on the other hand.

The electric circuit is configured to connect the shield to ground. Other terms, such as earth, may be used instead of the term ground. The term ground refers to a fixed potential in the pipetting system. The electric circuit may have an internal ground connection that is coupled to the shield. It is also possible for the electric circuit to be connected to an external ground connection, such as to a housing of the pipetting system, and to provide a coupling between this external ground connection and the shield.

According to a further embodiment, the time-variable electrical signal is a periodic signal. In particular, the time-variable electrical signal may be a sinusoidal time-variable electrical signal. A periodic signal is particularly well suited to excite the system of the pressure tube, the coupling and the pipetting tip to an electrical oscillation and to determine the contact between the pipetting tip and the pipetting liquid from the behavior of the resulting oscillating circuit. The term periodic signal also includes a signal that is periodic in sections, for example a time-variable electrical signal in which sections of periodic signal waveforms alternate with signal pauses. A time-variable electrical signal with subsequent signal sections of respective periodic signal waveforms of different frequencies also falls under the term periodic signal.

According to a further embodiment, the periodic signal has a frequency of between 450 kHz and 700 kHz, in particular a frequency of between 500 kHz and 650 kHz.

According to a further embodiment, the electric circuit is configured to determine a resonant frequency of the excited system when the time-variable electrical signal is applied. In this context, the expression "when the time-variable electrical signal is applied" includes determining the resonant frequency during application of the time-variable electrical signal or after application of the time-variable electrical signal. In the first case, the behavior of the excited system can be observed during a forced oscillation, in which the resonant frequency can be determined by how well the excited system resonates. In the second case, the system can be excited with a time-variable electrical signal that can have, for example, a frequency close to an expected resonant frequency, wherein the resonant frequency can be determined via a free oscillation of the system after excitation. Determining the resonant frequency may include determining a value of the resonant frequency. It is also possible that no specific value for the resonant frequency is determined, but rather it is determined in which range of values the resonant frequency lies. For example, it can be determined whether the resonant frequency is below or above a predetermined threshold. Such a binary determination of the range of values of the resonant frequency permits an evaluation of comparatively low complexity, but may be sufficient for the binary decision whether contact between the pipetting tip is present or not. The excited system includes the pressure tube, the coupling, the pipetting tip and, in case of contact with the pipetting liquid, the pipetting liquid and, potentially, the container of the pipetting liquid. The capacitances and inductances, in particular the parasitic capacitances and inductances, of the components of the excited system form an oscillating circuit whose resonant frequency changes upon contact between the pipetting tip and the pipetting liquid. The resonant frequency of the excited system can thus be used to detect the contact between the pipetting tip and the pipetting liquid. By applying different time-variable electrical signals, in particular time-variable electrical signals with different frequencies, a particularly reliable determination of the resonant frequency of the excited system can be achieved.

According to a further embodiment, the electric circuit is configured to apply the time-variable electrical signal to the pressure tube repeatedly or continuously and to detect the contact between the pipetting tip and the pipetting liquid on the basis of a change in the resonant frequency of the excited system. By differentially observing the resonant frequency of the excited system at different times, the contact between the pipetting tip and the pipetting liquid can be detected particularly conveniently. In particular, the potentially complex process of setting a threshold for the resonant frequency and comparing a particular resonant frequency to the threshold can be omitted.

According to an alternative embodiment, the electric circuit is configured to apply a second time-variable electrical signal to the shield. In other words, instead of connecting the shield to ground, the electric circuit, in addition to applying the time-variable electrical signal to the pressure tube, may be configured to apply a second time-variable electrical signal to the shield. By means of the second time-variable electrical signal, a very low capacitance between the pressure tube and the shield can be achieved and a very undisturbed application of the time-variable electrical signal to the pressure tube can be achieved. The time-variable electrical signal applied to the pressure tube is also referred to as the first time-variable electrical signal in the context of the alternative embodiment.

According to a further embodiment, the electric circuit is configured to apply the first time-variable electrical signal and the second time-variable electrical signal to the pressure tube and the shield in synchronized manner. In this case, the first and the second variable electrical signal can be applied to the pressure tube and the shield with a synchronized start. Alternatively/additionally, the first and second time-variable electrical signals can be synchronized with each other at predetermined points in time in the signal flow, in particular the first and the second time-variable electrical signals can be periodically synchronized with each other. By synchronized application of the first and second time-variable electrical signals, particularly good shielding against interference can be achieved.

According to a further embodiment, the second time-variable electrical signal corresponds to the first time-variable electrical signal. In particular, the first time-variable electrical signal and the second time-variable electrical signal may have substantially the same signal shape. To this end, the electric circuit may generate two identical signals or generate one signal and apply this one signal to the pressure tube and the shield as the first time-variable electrical signal and the second time-variable electrical signal, respectively. Due to the correspondence of the first time-variable electrical signal and the second time-variable electrical signal, a particularly good shielding, in particular a shielding in the sense of a coaxial cable, can be achieved.

According to a further embodiment, the first time-variable electrical signal and the second time-variable electrical signal are periodic signals. The frequency of the first time-variable electrical signal and of the second time-variable electrical signal may be between 450 kHz and 700 kHz, in particular between 500 kHz and 650 kHz.

The following features and modifications are applicable both to the embodiment described first, according to which the electric circuit is configured to connect the shield to ground, and to the alternative embodiment, according to which the electric circuit is configured to apply a second time-variable electrical signal to the shield.

According to a further embodiment, the electric circuit is configured to apply a voltage waveform as the time-variable electrical signal to the pressure tube. The voltage waveform may have any suitable shape. For example, the voltage waveform can be sinusoidal or consist of voltage pulses spaced apart in time. In particular, the voltage pulses may be voltage pulses of substantially constant voltage. It is emphasized that the electric circuit may also be configured to apply a current waveform as the time-variable electrical signal to the pressure tube.

According to a further embodiment, the electric circuit is configured to receive a time course of an electrical variable at the pressure tube and to detect a contact between the pipetting tip and the pipetting liquid from the time course of the electrical variable at the pressure tube. The electrical variable at the pressure tube is the response to the time-variable electrical signal. Due to the abrupt change in capacitance between the pipetting tip and the pipetting liquid, when the pipetting tip and the pipetting liquid make contact, the response to the time-variable electrical signal varies depending on whether there is contact or not. The electrical variable can be tapped at any suitable location on the pressure tube or a component conductively connected to the pressure tube. It is also possible to determine the electrical variable at the signal output of the electric circuit for the time-variable electrical signal. For example, the electrical variable at the pressure tube may be the current generated in response to the application of a voltage waveform. The electrical variable may also be, for example, the voltage at the pressure tube or at a component conductively connected to the pressure tube, which arises in response to the application of a current waveform. Depending on the design of the pressure tube and the pipetting tip, depending on the design of the time-variable electrical signal, and depending on the positions for applying the time-variable electrical signal and for tapping said electrical variable, decision criteria can be established as to whether or not the tapped electrical variable indicates contact between the pipetting tip and the pipetting liquid.

According to a further embodiment, the electric circuit is configured to analyze the time course of the electrical variable with respect to amplitude and/or slope and/or integral and/or frequency and/or phase and, based thereon, to detect a contact between the pipetting tip and the pipetting liquid. A change in amplitude and/or slope and/or integral and/or frequency and/or phase can indicate a change in capacitance between the pipetting tip and the pipetting liquid and can, thus, be interpreted as the occurrence or absence of a contact between the pipetting tip and the pipetting liquid. Simple limit values for amplitude and/or slope and/or integral and/or frequency and/or phase can be used for the detection. However, it is also possible to apply more complex signal processing to the time course of the electrical variable and to detect the contact therefrom.

According to a further embodiment, the electric circuit is in the form of an integrated circuit component. The term integrated circuit component does not necessarily mean that the electric circuit is in the form of an integrated circuit (IC) in a narrow sense. Rather, the term integrated circuit component is to be understood to the effect that the electric circuit is present as a coherent, single component or as a coherent, single assembly and, in particular, is designed in a manner that allows for the electric circuit to be mounted on and to be removed from the pipetting unit as a whole. The electric circuit may be implemented as a single circuit component, and may in particular embodiments also be present as an integrated circuit in a more narrow sense. The electric circuit can thus be easily mounted, removed and replaced.

According to a further embodiment, the electric circuit is implemented as a circuit with printed conductor paths. In technical language, the circuit with printed conductor paths is also referred to as a printed circuit. In this way, the electric circuit can be produced with very small size, high accuracy and high reliability.

According to a further embodiment, the electric circuit is implemented as a flexprint, in particular as a multilayer flexprint. The term flexprint refers to a circuit with printed conductor paths that is not applied to a rigid board, but has mechanical flexibility. For example, the printed conductor paths may be incorporated into a flexible, rubber-like carrier. The term flexprint may refer to a flexible printed circuit. Especially in the field of laboratory automation, the components of pipetting systems move extremely frequently and extremely quickly, both in relation to the pipetting liquid and relative to each other, e.g. when connecting and disconnecting a pipetting tip. The flexprint design allows the electric circuit to effectively provide the variable electrical signal, while allowing for a high degree of flexibility for the highly compact assembly of the pipetting system. The flexprint can be arranged particularly well, such that it does not interfere with the frequent and rapid movements of the components, despite a high integration density of the pipetting system.

According to a further embodiment, the electric circuit is fixed to the pipetting unit with a screw. Furthermore, the electric circuit can be electrically coupled to the pressure tube via the screw. Thus, both the mechanical fixation of the electric circuit and the electrical coupling to the pressure tube can be performed via one component. The screw can provide the dual function of mechanical fixation of the electric circuit on the one hand and electrical coupling between the electric circuit and the pressure tube on the other hand. It is possible to additionally use a screw, provided for the mechanical fixation, for the electrical coupling between the electric circuit and the pressure tube. In this way, a separate electrical connection between the electric circuit and the pressure tube, which may be prone to errors due to the high integration density, can be avoided.

According to a further embodiment, the electric circuit is coupled to the pressure tube via the screw and a threaded hole or via the screw and a screw nut. In other words, the time-variable electrical signal may be applied to the pressure tube via the screw and a threaded hole or via the screw and a screw nut. For this purpose, there may be a permanent electrical connection between the threaded hole and the pressure tube or the screw nut and the pressure tube, which can be achieved with less complexity and high reliability in terms of manufacturing.

According to a further embodiment, the electric circuit is connected to the pressure tube at an end portion of the pressure tube distal from the pipetting tip. In this way, the pressure tube and the shield can be provided over a long length as a structural unit with small cross-sectional extension. A large integration density of pipetting units in pipetting systems with a large number of pipetting units can be achieved, with sufficient space for coupling and uncoupling pipetting tips.

According to a further embodiment, the shield is movably supported relative to the pressure tube. In particular, the shield can be movable to exert an ejection force on a connected pipetting tip. In this way, the shield can perform the dual function of an electrical shield for the time-variable electrical signal on the pressure tube and a mechanical component designed for disconnecting a pipetting tip. The shield may be arranged coaxially with the pressure tube, with appropriate bearings allowing linear movement of the shield with respect to the pressure tube.

According to a further embodiment, the pipetting unit further comprises an ejection spring, which is arranged at an end portion of the shield distal from the pipetting tip. In particular, the electric circuit may be electrically coupled to the shield via the ejection spring. In other words, the electric circuit can ground the shield via the ejection spring. In this way, the ejection spring can perform the dual function of exerting a force for movement on the shield on the one hand and electrically coupling the electric circuit and the shield on the other hand.

According to a further embodiment, the ejection spring is arranged coaxially around the pressure tube. In this way, the ejection spring can, on the one hand, apply a circumferential force to move the shield. On the other hand, the ejection spring can form an effective part of the shield of the pressure tube and can, thus, help that the time-variable electrical signal can be used, to a high degree without interference, for detecting the contact between the pipetting tip and the pipetting liquid.

According to further embodiment, the pipetting unit comprises a plurality of ejection springs, in particular two, three or four ejection springs, which are arranged at an end portion of the shield distal from the pipetting tip. In this case, the electric circuit may be electrically coupled to the shield via one or more or all of the plurality of ejection springs. The plurality of ejection springs may be disposed around the pressure tube, and in particular may be disposed around the pressure tube at regular radial distances from one another. Instead of a circumferential force for moving the shield, the plurality of ejection springs then apply the force for moving the shield in spaced-apart regions.

According to a further embodiment, the ejection spring or springs is/are made of steel, in particular stainless steel, further in particular chrome steel. With these materials, the two functions of applying the mechanical force for movement and of the electrical connection can be achieved particularly well.

According to a further embodiment, the pipetting unit has an isolator arranged at an end portion of the shield facing the pipetting tip. In particular, the isolator may be arranged between the shield and the coupling and/or between the shield and a connected pipetting tip. Thus, the time-variable electrical signal and the ground potential can be effectively isolated from each other at the end portion of the shield facing the pipetting tip.

According to a further embodiment, the shield is arranged coaxially with the pressure tube. In this way, a particularly compact design as well as a particularly effective shielding of the time-variable electrical signal against the interference effects from the surroundings is possible. The shield may have a length substantially equal to that of the pressure tube. It is also possible for the pressure tube to protrude from the shield at the end distal from the pipetting tip and/or at the end facing the pipetting tip.

According to a further embodiment, the coupling is an active coupling for fixing and releasing a pipetting tip. In other words, the coupling may be an active coupling for coupling and uncoupling a pipetting tip. In particular, the active coupling may be a solenoid-driven coupling. The coupling may have control or cam surfaces for fixing/releasing pipetting tips. The cam surfaces may apply a force to movable parts of the coupling, such as movable balls or a movable O-ring. The cam surfaces can be moved by the solenoid if the coupling is a solenoid-driven coupling. The cam surfaces can be used to change the radial position of the balls or O-ring so that a pipetting tip can be held in position. By moving the balls or the O-ring radially inward, a mechanical fixation of the pipetting tip can be released so that the pipetting tip can be uncoupled. Uncoupling can then be accomplished via a separate mechanism, for example via the interaction of the ejection spring and the shield described above.

According to a further embodiment, the pipetting unit further comprises a linear motor connected to the pressure tube, wherein a piston is movably arranged in the linear motor and wherein pressure changes in the pressure tube for aspirating or dispensing pipetting liquid are possible by movement of the piston.

In particular, the linear motor can be a linear electric motor. In particular, the piston may be equipped with permanent magnets, and a plurality of electromagnets may be arranged around the movement path of the piston. By appropriately controlling the electromagnets, the piston in the linear motor can be moved and cause desired pressure changes in the pressure tube. The linear motor may be permanently installed and connected to the pressure tube. It is also possible that the linear motor is designed as an integrated assembly and can be replaced as a whole.

Exemplary embodiments of the invention comprise furthermore a combination of a pipetting unit and a pipetting tip, the combination comprising a pipetting unit according to any of the embodiments described above and comprising a conductive pipetting tip that can be attached to the pipetting unit. The additional features, modifications and technical effects, described above for the pipetting unit, apply analogously to the combinations of the pipetting unit and a pipetting tip. The pipetting unit and the conductive pipetting tip may be present as a kit. It is also possible that the pipetting unit is incorporated as part of a pipetting system, and that a conductive pipetting tip or a supply of conductive pipetting tips is provided separately. Exemplary embodiments of the invention also include the combination of the pipetting unit and the pipetting tip, wherein the conductive pipetting tip is attached to the pipetting unit.

According to a further embodiment, the pipetting tip is a disposable pipetting tip. Here, the term disposable pipetting tip refers to a pipetting tip that has a much shorter lifetime compared to the pipetting unit. In particular, the term disposable pipetting tip may refer to a pipetting tip which, as a rule, is used for only one aspiration and dispensing operation. However, it is also possible that the disposable pipetting tip is used for a small plurality of aspiration and dispensing operations, for example for at most ten, in particular at most five aspiration and dispensing operations. In this way, contamination of the samples due to contamination of the pipetting tip can be avoided or at least kept low in laboratory automation.

According to a further embodiment, the pipetting tip is made of a conductive polymer material. The manufacture from conductive polymer material allows for the application of the time-variable electrical signal up to the pipetting tip opening, whereby the pipetting tip can be manufactured at reasonable costs. In particular, such manufacture allows for the use of the pipetting tip as a disposable pipetting tip in a reasonable manner.

Exemplary embodiments of the invention further include a pipetting system comprising at least one pipetting unit according to any of the embodiments described above. In particular, the pipetting system may comprise a plurality of pipetting units, each of which is configured according to any of the embodiments described above. The additional features, modifications and technical effects, described above for the pipetting unit, apply analogously to the pipetting system. In particular, the pipetting system may comprise 96 pipetting units, each of which is formed according to any of the embodiments described above. In this way, the pipetting system can work quickly and effectively with containers commonly used in laboratory automation, which are formed in an 8×12 grid. Other numbers of pipetting units are also possible, especially other numbers that are well suited for existing grid dimensions.

Exemplary embodiments of the invention further include a method for capacitively detecting pipetting liquid by a pipetting unit, comprising applying a time-variable electrical signal to a pressure tube of the pipetting unit, from which the time-variable electrical signal is applied to a pipetting tip via a coupling; providing a ground connection for a shield of the pipetting unit that is arranged around the pressure tube, wherein the time-variable electrical signal and the ground connection are provided by a common electric circuit; and detecting a contact between the pipetting tip and the pipetting liquid by means of the time-variable electrical signal. The additional features, modifications and technical effects, described above with reference to the pipetting unit, apply analogously to the method of capacitively detecting pipetting liquid by a pipetting unit.

According to a further embodiment, the time-variable electrical signal is a periodic signal.

According to a further embodiment, the method further comprises: determining a resonant frequency of the excited system upon application of the time-variable electrical signal.

According to a further embodiment, the method further comprises: repeatedly or continuously applying the time-variable electrical signal to the pressure tube and detecting the contact between the pipetting tip and the pipetting liquid based on a change in the resonant frequency of the excited system.

According to a further embodiment, applying the time-variable electrical signal comprises applying a voltage waveform to the pressure tube.

According to a further embodiment, the method further comprises: receiving or measuring or recording a time course of an electrical variable at the pressure tube. The step of detecting the contact between the pipetting tip and the pipetting fluid may be performed by means of the time-variable electrical signal and the time course of the electrical variable at the pressure tube.

According to a further embodiment, the method further comprises: analyzing the time course of the electrical variable with respect to amplitude and/or slope and/or integral and/or frequency and/or phase and detecting the contact between the pipetting tip and the pipetting liquid based thereon.

According to a further embodiment, applying the time-variable electrical signal comprises applying the time-variable electrical signal to a screw with which an electric circuit, from which the time-variable electrical signal originates, is fixed to the pipetting unit and which is electrically coupled to the pressure tube. In particular, the screw may be electrically coupled to the pressure tube via a threaded hole or a screw nut.

According to a further embodiment, providing a ground connection for the shield comprises providing a ground connection for an ejection spring which is electrically coupled to the shield and through which the shield can be moved relative to the pressure tube.

Exemplary embodiments of the invention further include a computer program or computer program product that includes program instructions that, when executed on a data processing system, effect a method according to any of the embodiments described above. In this regard, the individual steps of the method may be prompted by the program instructions and performed by other components or may be executed in the data processing system itself.

BRIEF DESCRIPTION OF THE DRAWINGS

Further exemplary embodiments of the invention will be described below with reference to the accompanying drawings.

FIG. 2 shows the pipetting unit of FIG. 1 in a side view;

DETAILED DESCRIPTION

Figure 1:
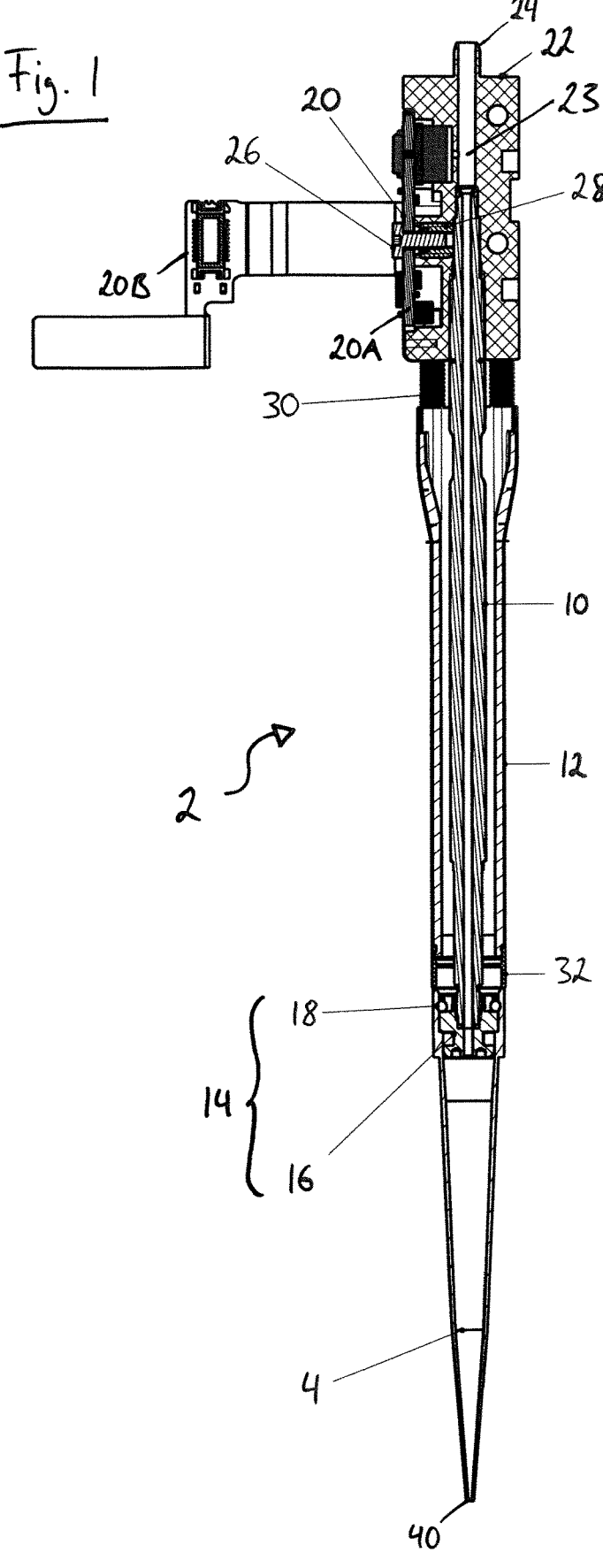
FIG. 1 shows a pipetting unit according to an exemplary embodiment of the invention in a longitudinal section.

FIG. 1 shows a pipetting unit 2 according to an exemplary embodiment of the invention in a longitudinal sectional view. A pipetting tip 4 is attached to the pipetting unit 2. The pipetting tip 4 can be coupled to and uncoupled from the pipetting unit 2, as described in detail below. Thus, it can also be said that FIG. 1 shows a combination of a pipetting unit 2 and a pipetting tip 4.

The pipetting unit 2 has a pressure tube 10. The pressure tube 10 is rigidly connected to a holder 22. In particular, the pressure tube 10 can be inserted, in particular pressed, into a corresponding receptacle of the holder 22. A pressure line 23 extends through the holder 22, which is in fluid communication with the pressure tube 10. In the orientation of FIG. 1, which corresponds to the operating position of the pipetting unit 2, the pressure tube 10 extends downward from the holder 22. At the end of the holder 22 distal from the pressure tube, the holder 22 has a motor connection 24, to which an electric motor for changing the pressure in the pressure line 23 and the pressure tube 10 can be connected. The motor connection and the electric motor will be described below with reference to FIGS. 3 and 4.

The pipetting unit 2 further comprises a shield 12 arranged coaxially around the pressure tube 10. The longitudinal extension of the shield 12 is smaller than the longitudinal extension of the pressure tube 10. Upwardly, the pressure tube 10 projects from the shield 12 and extends into the holder 22, as described above. Downwardly, the pressure tube 10 projects from the shield 12 and forms a support for the pipetting tip 4, as described below. Although the shield 12, in total, is significantly shorter than the pressure tube 10, the shield 12 extends along a majority of the length of the portion of the pressure tube 10 that protrudes from the holder 22.

The shield 12 is movable longitudinally with respect to the pressure tube 10. An ejection spring 30 is disposed between the shield 12 and the holder 22. The ejection spring 30 exerts a force on the shield 12 that seeks to move the shield 12 relative to the pressure tube 10 and the holder 22 and that seeks to move the shield 12 downward to eject the pipetting tip 4. Thus, the shield 12 exerts an ejection force on the pipetting tip 4 as a result of the force exerted by the spring 30. The ejection mechanism will be described in detail below. The ejection spring 30 is arranged coaxially around the pressure tube 10. In particular, the ejection spring 30 may be disposed between a lower end surface of the holder 22 and an upper end surface of the shield 12, in order to effectively transfer the spring force to the shield 12. Instead of one ejection spring 30 arranged coaxially around the pressure tube 10, there may also be arranged a plurality of ejection springs around the pressure tube 10. The individual ejection springs of this plurality of ejection springs are smaller in cross-section than the ejection spring 30 arranged coaxially around the pressure tube 10. For example, in the longitudinal sectional view of FIG. 1, one ejection spring may be arranged on either of the right and the left of the pressure tube 10.

The shield 12 may be an injection molded part. For example, it may consist of a chrome-coated nickel-copper-nickel assembly, and the outer surfaces may be painted for isolation. The ejection spring 30/the ejection springs may be made of chrome steel, for example.

The pipetting unit 2 further comprises a coupling 14. The coupling 14 enables the pipetting tip 4 to be temporarily fixed to the pipetting unit 2. In particular, the coupling 14 enables the pipetting tip 4 to be secured to the pipetting unit 2 in such a way that the pipetting tip 4 is immovable with respect to the pressure tube 10. The coupling 14 comprises a positioning member 16 and a plurality of balls 18, arranged around the pressure tube 10 in a cage. The cage allows for radial movement of the balls 18 within predetermined limits and prevents free movement of the balls 18. The positioning member 16 has a downward-directed abutment surface, with which a step along the inner surface of the pipetting tip 4 is in engagement, when the pipetting tip 4 is attached to the pipetting unit 2. Due to the interaction of the abutment surface of the positioning member 16 and the step on the inner surface of the pipetting tip 4, the pipetting tip 4 is brought into a well-defined position in the longitudinal direction, i.e. into a well-defined position in the up-down direction, when it is placed on the pipetting unit 2.

The balls 18 are part of a locking mechanism for fixing the pipetting tip 4 to the pipetting unit 2. When the pipetting tip 4 is brought into the correct longitudinal position, a radially outward directed force is applied to the balls 18 via suitable cam surfaces, so that the balls 18 move radially outwards into corresponding recesses in the pipetting tip 4. The cam surfaces furthermore have the effect that the balls 18 cannot move back radially inwards. Thus, the pipetting tip 4 is secured to the pipetting unit 2, and the ejection force, applied by the shield 12 via the ejection spring 30, cannot eject the pipetting tip 4. The pipetting tip 4 remains firmly attached to the pipetting unit 2, without having to be held in this position from the outside.

When the pipetting tip 4 is to be removed, the cam surfaces are moved to release the balls 18 of the coupling 14 in so far as they can move radially inwards. The ejection force applied by the shield 12 pushes the pipetting tip 4 downwards and uncouples the same from the pressure tube 10.

The pipetting tip 4 has a pipetting tip opening 40. When the pipetting tip 4 is connected to the pipetting unit 2, a compressed air volume is created in the pipetting tip 4, the pressure tube 10, the pressure line 23 and the connected electric motor. This compressed air volume is closed off or sealed with the exception of the pipetting tip opening 40. By changing the pressure in the compressed air volume by means of the connected electric motor, pipetting liquid can be aspirated or dispensed through the pipetting tip opening 40.

The pressure tube 10, the shield 12, the positioning member 16 and the pipetting tip 4 are electrically conductive. An isolator 32 is provided at the end of the shield 12 facing the pipetting tip and is positioned between the shield 12 and the pipetting tip 4, when the pipetting tip 4 is connected. Thus, there is no electrical connection between the shield 12 on the one hand and the pressure tube 10, the coupling 14 and the pipetting tip 4 on the other hand. The pressure tube 10 is electrically connected to the connected pipetting tip 4 via the coupling 14. In the exemplary embodiment of FIG. 1, both the positioning member 16 and the balls 18 are electrically conductive.

The pipetting unit 2 further comprises an electric circuit 20. The electric circuit 20 has a first part 20A, disposed on the holder 22, and a second part 20B, extending away from the holder 22. In this way, the electric circuit 20 can conveniently apply electrical signals to the pressure tube 10 and the shield 12, as described below, and can, on the other hand, conveniently form a connection to other components, such as a power supply and a motor controller. The two parts 20A, 20B of the electric circuit 20 are formed as an integral assembly that can be attached to or removed from the holder 22 as a whole. In particular, the electric circuit 20 may be formed as a flexprint. In this way, the comparatively complex geometric arrangement of the electric circuit 20 can be rendered possible, while the inherent flexibility is also beneficial in attaching the electric circuit 20 to the holder 22 and integrating the pipetting unit 2 into a pipetting system.

The electric circuit 20 is attached to the holder 22 by a screw 26 and a threaded hole 28. The threaded hole 28 is in contact with the pressure tube 10, so that there is an electrical connection between the threaded hole 28 and the pressure tube 10. There is also an electrical connection between the screw 26 and the threaded hole 28 due to the mechanical contact.

The electric circuit 20 has an electrical connection to the screw 26. Furthermore, the electric circuit 20 has an electrical connection to the ejection spring 30. Accordingly, the electric circuit 20 can issue/apply an electrical signal or an electrical potential to the screw 26 and the ejection spring 30.

In operation, the electric circuit 20 performs capacitive detection of a contact between the pipetting tip 4 and a pipetting liquid. In other words, the electric circuit 20 monitors in operation whether or not there is contact between the pipetting tip 4 and a pipetting liquid. For this purpose, the electric circuit 20 outputs a time-variable electrical signal to the screw 26. Furthermore, the electric circuit 20 applies a ground potential to the ejection spring 30. By application to the screw 26, the time-variable electrical signal is also applied to the threaded hole 28, the pressure tube 10, the coupling 14, and the pipetting tip 4. By applying a ground potential to the ejection spring 30, the shield 12 is also connected to ground.

In the exemplary embodiment of FIG. 1, the time-variable electrical signal, applied to the screw 26 by the electric circuit 20, is a periodic voltage waveform or a voltage waveform with periodic signal sections. According to the principle of a coaxial cable, the ground potential on the shield 12 shields the time-variable electrical signal. In particular, interference effects, such as parasitic capacitances between the shield 12 and the surroundings of the pipetting unit 2, can be kept away from the pressure tube 10. Also, the influence of interference effects on the entire system, excited by the time-variable electrical signal, can be kept low.

Instead of the ground potential, there may also be a second time-variable electrical signal applied to the shield 12 from the electric circuit 20 via the ejection spring 30. In this case, the first time-variable electrical signal, i.e. the time-variable electrical signal applied to the pressure tube 10, and the second time-variable electrical signal may be periodic voltage waveforms or voltage waveforms with periodic signal sections. In particular, the first time-variable electrical signal and the second time-variable electrical signal may be applied to the screw 26 and the ejection spring 30 in a synchronized manner. Further, the first time-variable electrical signal and the second time-variable electrical signal may be corresponding electrical signals, having the same signal shape.

In this way, corresponding electrical signals are applied to the pressure tube 10 and the shield 12 and ejection spring 30 components, disposed therearound. A possible detrimental influence of a capacitance between the pressure tube 10 and the shield 12 can thus be kept particularly low.

The time-variable electrical signal described above, which is applied to the screw 26, is present up to the pipetting tip 4, with the components screw 26, threaded hole 28, pressure tube 10 and coupling 14 being used as signal transmission components. The ground potential described above is applied to the shield 12, using the component ejection spring 30 as the electrical connection component. The electric circuit 20 may therefore be connected to and utilize components in close proximity to apply the time-variable electrical signal and the ground potential. As a single component, the electric circuit 20 may provide for generating the time-variable electrical signal and providing the time-variable electrical signal and ground to the pressure tube 10 and the shield 12. The electric circuit may be implemented as an integrated circuit component and may be compact in design.

For detecting the contact between the pipetting tip 4 and the pipetting liquid, the electric circuit 20 observes the behavior of the pipetting unit 2 and the pipetting tip 4, connected thereto, in response to the application of the time-variable electrical signal. When a periodic voltage waveform is applied to the screw 26, as described above, the electric circuit 20 can detect and evaluate the current flow that occurs in response to this voltage waveform. The relationship between the applied voltage and the resulting current flow can be used to infer the electrical properties of the components, excited by the signal, and their surroundings. For example, the ratio of voltage and current can be indicative of the inductances and capacitances present along the signal transmission path consisting of screw 26, threaded hole 28, pressure tube 10, coupling 14, and pipetting tip 4. In particular, the ratio between voltage and current can be used to draw conclusions about the resonant frequency of the excited system. The amplitude and/or phase shift of the current relative to the voltage can be used to infer how well the excited system resonates with the periodic voltage waveform. The current can be used to observe a forced oscillation of the excited system during the application of the periodic voltage waveform. In this regard, it makes a big difference for the capacitance of the excited system, i.e. for the capacitance of the excited oscillating circuit, whether the pipetting tip 4 is immersed in a pipetting liquid or is suspended freely in the air. The immersion of the pipetting tip 4 into a pipetting liquid is accompanied by a capacitance jump. By analyzing the current flow, when the periodic voltage waveform is applied, the electric circuit 20 can detect such a capacitance jump. In particular, the electric circuit can determine from the amplitude and/or slope and/or integral and/or frequency and/or phase shift of the current flow whether a significant change in capacitance has occurred. Such a significant change may be interpreted as the pipetting tip 4 being immersed into the pipetting liquid or the pipetting tip 4 being withdrawn from the pipetting liquid. The electric circuit 20 can pass on this information to the controller of the electric motor of the pipetting unit 2, so that the aspiration or dispensing of pipetting liquid can always take place at a defined immersion depth in the pipetting liquid.

Instead of the described forced oscillation of the excited system, it is also possible to excite the system in a first step with the time-variable electrical signal, in particular with a periodic time-variable electrical signal, and to analyze a free oscillation of the excited system in a second step after termination of the excitation. For example, in the first step, the electric circuit 20 may apply a periodic voltage waveform to the screw 26. Then, in the second step, the electric circuit 20 may observe the free oscillation of the excited system via the voltage waveform present at the screw and may determine the resonant frequency of the excited system based on that voltage waveform.

FIG. 2 shows a side view of the combination of the pipetting unit 2 and the connected pipetting tip 4 of FIG. 1. In particular, FIG. 2 shows the pipetting unit 2 and the pipetting tip 4 in a side view from the left in the drawing plane of FIG. 1. In the region of the transition between the shield 12 and the holder 22, the pipetting unit 2 is shown partially as a side view and partially cut open. The cut open portion exposes a view of a short section of the pressure tube 10, so that the connection of the pressure tube 10 to the holder 22 can be seen. Accordingly, a small portion of the shield 12, the ejection spring 30 arranged adjacent thereto, and a small portion of the holder 22 are only half shown in FIG. 2. It is understood that the ejection spring 30 and the shield 12 surround the pressure tube 10, also in the region shown cut open.

In FIG. 2, it can be seen that the electric circuit 20 extends over a large portion of the side surface of the holder 22. Various electrical components/electronics components are provided, which can, for example, perform the tasks of applying the time-variable electrical signal, providing the ground connection, analyzing the response of the pipetting unit 2 and the pipetting tip 4 to the time-variable electrical signal, communicating with the controller of the electric motor, etc.

Figure 3:
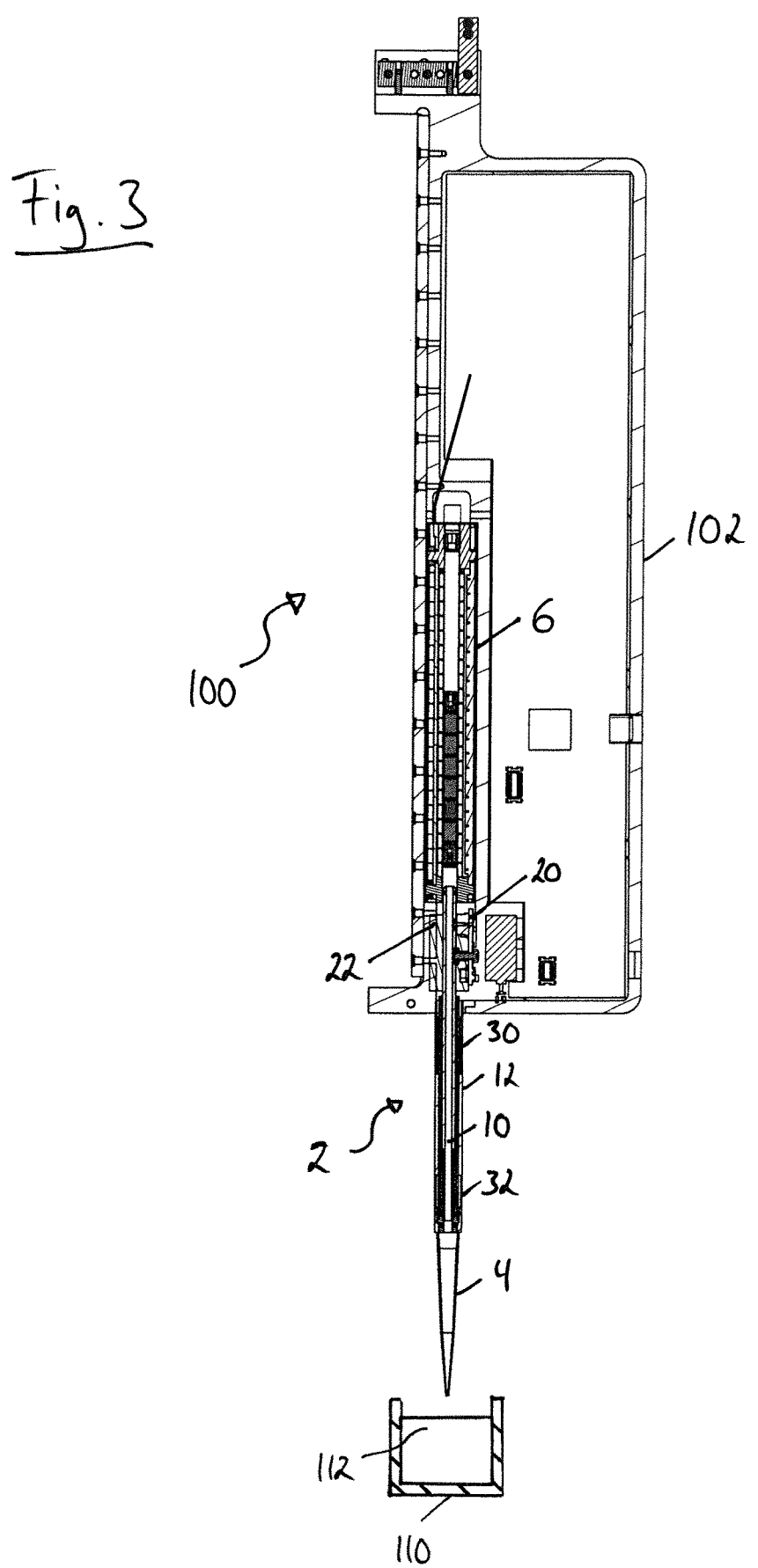
FIG. 3 shows a pipetting system according to an exemplary embodiment of the invention in a longitudinal section.

FIG. 3 shows a pipetting system 100 according to an exemplary embodiment of the invention in a longitudinal sectional view. The pipetting system 100 comprises a pipetting unit 2 according to an exemplary embodiment of the invention. The pipetting unit 2 of the pipetting system 100 of FIG. 3 may be the pipetting unit 2 of FIGS. 1 and 2, but may also have an altered design. FIG. 3 further shows an electric motor 6 as part of the pipetting unit 2, which has already been indicated above with reference to FIGS. 1 and 2. As in FIGS. 1 and 2, the pipetting unit 2 is shown in FIG. 3 with a pipetting tip 4 connected thereto.

Due to the arrangement of the pipetting unit 2 in the pipetting system 100 and its use in the pipetting system 100, the pipetting unit 2 is a component of the pipetting system 100. FIG. 3 shows the pipetting unit 2 in the same longitudinal sectional plane as FIG. 1, but as a mirror image. Accordingly, the pipetting system 100 is also shown in this longitudinal sectional plane.

The pipetting system 100 has a housing 102, to which pipetting unit 2 is attached. In particular, the pipetting unit 2 is attached to the housing 102 by means of the holder 22. The pressure tube 10 and the shield 12 of the pipetting unit 2 protrude from the housing 102. In particular, the pressure tube 10 and the shield 12 protrude downward from the housing 102 in the drawing plane of FIG. 3, which corresponds to the operating orientation of the pipetting system 100. The pressure tube 10 extends from inside the housing 102 to the outside of the housing 102. Due to the attachment of the holder 22 to the housing 102, the pressure tube 10 is stationary with respect to the housing 102 of the pipetting system.

As mentioned above, the pipetting unit 2 may have the design described with reference to FIGS. 1 and 2. However, it is also possible that the pipetting unit 2 is different from the design described with reference to FIGS. 1 and 2. In particular, the pipetting unit 2 is shown in FIG. 3 such that the pressure tube 10 extends through the entire holder 22 and itself forms the motor connection. Moreover, the ejection spring 30 is shown in FIG. 3 as exerting a force between the housing 102 of the pipetting system 100 and the shield 12. Also in this configuration, the electric circuit of the pipetting unit 2 is connected to the ejection spring 30 to provide the ground connection.

Figure 4:
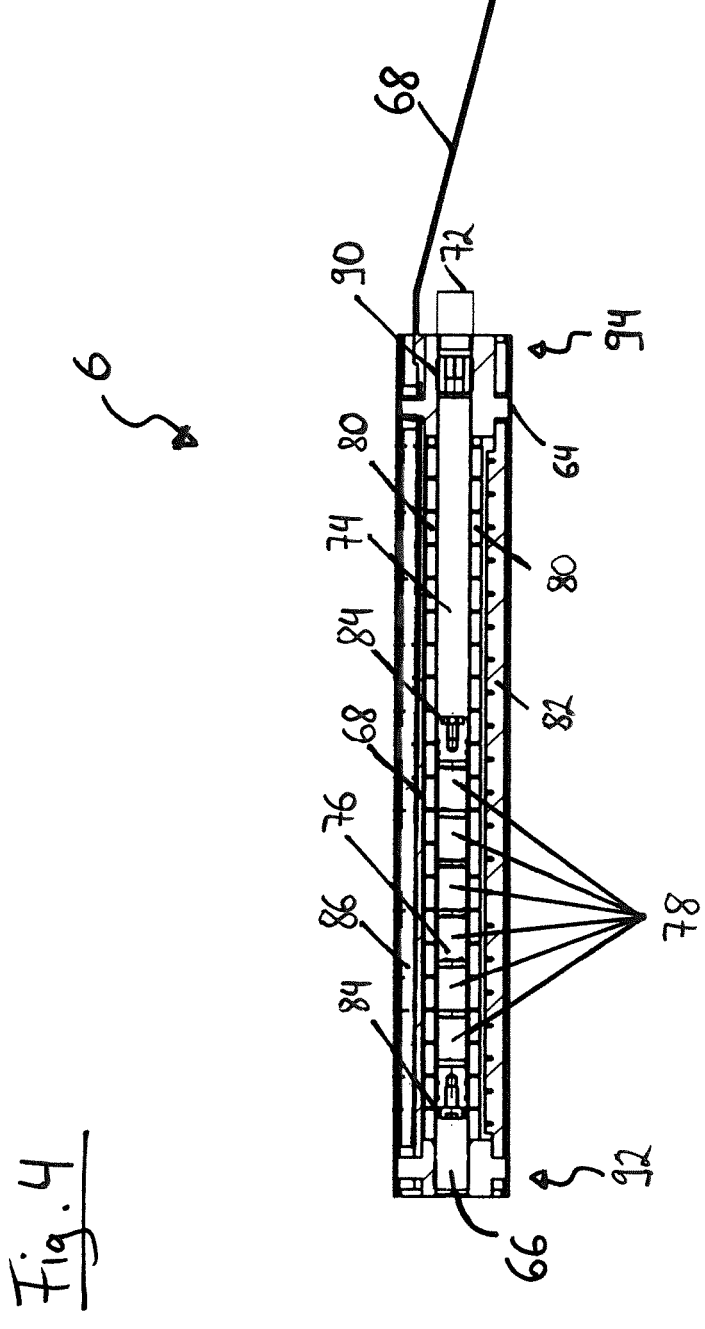
FIG. 4 shows an electric motor in a longitudinal section, as it can be used in a pipetting unit according to an exemplary embodiment of the invention.

The pipetting unit 2 of FIG. 3 has an electric motor 6. The electric motor 6 is arranged above the holder 22. The pressure tube connection of the electric motor 6, which is described below with reference to FIG. 4, is connected to the motor connection of the holder 22 or directly to the pressure tube 10. In the exemplary embodiment of FIG. 3, the electric motor 6 is present as an integrated assembly that can be inserted into the housing 102 or removed from the housing 102 as a whole. Thus, the electric motor 6 can be easily replaced during maintenance of the pipetting system 100 or in the event of other problems.

Aspiration or dispensing of a pipetting liquid by the pipetting tip 4 is accomplished by building up or reducing a gas pressure in the volume of compressed air, formed in the interior of the electric motor 6, in the pressure tube 10, and in the pipetting tip 4. The build-up or release of the gas pressure is accomplished by the movement of a piston in the electric motor, as described below with reference to FIG. 4.

Control of the build-up or release of gas pressure may be initiated in that contact between the pipetting tip 4 and a pipetting liquid has been detected by the electric circuit 20. The contact between the pipetting tip 4 and the pipetting liquid is achieved by moving the pipetting unit 2 vertically. During the vertical movement, the above-described detection of the presence or absence of contact between the pipetting tip 4 and the pipetting liquid takes place. For illustration purposes, FIG. 3 shows a container 110 in which pipetting liquid 112 is present. By moving the pipetting unit 2 vertically, contact can be established between the pipetting tip 4 and the pipetting liquid 112, and pipetting liquid can then be aspirated or dispensed by building up or reducing the gas pressure in the pressure tube 10 by means of the electric motor 6.

In FIG. 3, for reasons of clarity, the pipetting system 100 is shown with a pipetting unit 2 and a pipetting tip 4. It is understood that the pipetting system 100 may comprise a plurality of pipetting units 2, each with its own electric motor 6. To each of this plurality of pipetting units 2, a pipetting tip 4 may be temporarily attached, i.e. coupled and uncoupled. For example, 96 pipetting units 2 may be provided, which may be arranged in a standardized grid pattern in the pipetting system 100. It is also possible that the plurality of pipetting units 2 can be individually moved vertically, so that they can each be individually immersed into selected containers with pipetting liquid.

FIG. 4 shows an electric motor 6 in a longitudinal sectional view, which can be used in a pipetting unit according to an exemplary embodiment of the invention. The electric motor 6 of FIG. 4 can be used in the pipetting system 100 of FIG. 3. In particular, the electric motor 6 of FIG. 4 may have the same design as the electric motor 6 of FIG. 3.

The electric motor 6 has a housing 64 accommodating a plurality of components. A power connection 68 and a guide member 72 protrude from the housing 64. The guide member 72 serves to reliably position the end of the electric motor 6, distal from the pressure tube, within the housing of the pipetting system.

A cylindrical guide tube 74 is disposed substantially centrally in the housing 64. The guide tube 74 terminates in a pressure tube connection or port 66 in an end portion 92 facing the pressure tube. The pressure tube port 66 is integrally formed with the guide tube 74 in the exemplary embodiment of FIG. 4. In particular, an end portion of the guide tube 74 forms the pressure tube port 66. A stop air filter unit 90 is provided in the end portion 94 facing away from the pressure tube. The stop air filter unit 90 prevents dust from entering the guide tube 74 and forms the end of the movement path of a piston 76, described below, which is arranged in the guide tube 74.

A plurality of coils 80 are arranged around the guide tube 74, only one of which is provided with a corresponding reference numeral. In the exemplary embodiment of FIG. 4, there are twenty coils 80. The coils 80 are arranged in a circle around the guide tube 74. They are arranged adjacent each other along the guide tube 74, for example, slid onto the guide tube 74 adjacent each other. The plurality of coils 80 are connected to the power connection 68, which, on the one hand, extends along the coils 80 from the pressure-tube facing end portion 92 into the pressure-tube distal end portion 94 and which, on the other hand, protrudes from the housing 64. The coils 80 are supplied with power via the power connection 68. They act as electromagnets during operation of the electric motor 6.

In the exemplary embodiment of FIG. 4, a conductor path is provided in the power connection 68 for each of the coils 80, in order to supply the coils 80 with current. It is also possible that multiple coils 80 are each supplied with current from one conductor path of the power connection 68. In particular, it is possible that three current phases are provided via the power connection 68, with one of the three current phases being applied to each coil 80.

A piston 76 is arranged in the guide tube 74. The piston 76 has a seal 84 on its side facing the pressure tube as well as on its side facing away from the pressure tube. The seals 84 separate the air volume between the piston 76 and the pressure tube connection 66, on the one hand, and between the piston 76 and the stop air filter unit 90, on the other hand.

The piston 76 has six permanent magnets 78, each having the same length along the piston 76. The permanent magnets 78 are arranged in the piston 76, with poles of the same polarity facing each other, respectively. An exemplary arrangement of the permanent magnets 78 would be SN-NS-SN-NS-SN-NS, where the hyphens denote the respective boundaries between the individual permanent magnets. In FIG. 4, the boundaries between the permanent magnets 78 are indicated by double dashes. Through the permanent magnets 78, the piston 76 generates a magnetic field with alternating south and north poles, which, due the arrangement of opposite poles facing each other, are formed in a highly clear-cut manner.

A plurality of magnetic field sensors 82 are further disposed in the housing 64. The magnetic field sensors 82 are arranged along the guide tube 74, outside the plurality of coils 80, and along a wall of the housing 64. A total of twenty magnetic field sensors are arranged along the guide tube 74, with reference numeral 82 appearing only once for clarity. In the present example, the plurality of magnetic field sensors 82 are Hall sensors. They measure the magnetic field prevailing at the respective positions of the electric motor 6. The measured values can be used to determine the position of the piston 76.

Furthermore, a cooling duct 86 is arranged in the housing 64 of the electric motor 6. The cooling duct 86 is disposed along a wall of the housing 64, on the opposite side, seen relative to the guide tube 74, from the plurality of magnetic field sensors 82. The cooling duct 86 extends substantially from the end portion 92 of the housing 64 facing the pressure tube 10 to the end portion 94 of the housing 64 facing away from the pressure tube 10. The cooling duct 86 has an opening through the housing 64 at both ends, so that cooling air can flow through the cooling duct 86 from the outside.

Operation of the electric motor 6 will be described in the following. Current is applied to the plurality of coils 80 via the power connection 68. By applying suitable currents to the plurality of coils 80, time-variable magnetic fields are generated, which apply a mechanical force to the permanent magnets 78 of the piston 76, moving the same within the guide tube 74. It is known to those skilled in the art how to design the flow of current through the plurality of coils 80 so as to achieve a desired movement of the piston 76. Accordingly, a more detailed description of the relationships between the movement of the piston 76 and the currents to be applied through the coils 80 can be dispensed with.

During operation, the plurality of magnetic field sensors 82 measure the magnetic field prevailing at respective locations within the housing 64. They transmit the measured values to a control unit of the electric motor 6. This control unit is able to determine the position of the piston 76 from the measured values of the magnetic field sensors 82. Based on this information, based on information about a contact between the pipetting tip and the pipetting liquid, and based on a desired aspiration or dispensing process, the control unit applies appropriate currents to the plurality of coils 80 via the current connection 68, so that the desired movement of the piston 76 takes place. A control loop may exist between the piston 76, the magnetic field sensors 82, the control unit, the current connection 68, and the coils 80, which permits highly precise positioning of the piston 76 within the guide tube 74.

Although the invention has been described with reference to exemplary embodiments, it will be apparent to those skilled in the art that various modifications may be made and equivalents used, without departing from the scope of the invention. The invention is not intended to be limited by the specific embodiments described. Rather, it includes all embodiments covered by the appended claims.

The invention claimed is:

1. A pipetting unit configured for capacitive liquid detection, comprising:
   a pressure tube;
   a shield disposed around the pressure tube and movably supported relative to the pressure tube;
   a coupling configured to temporarily attach a pipetting tip to the pipetting unit, wherein attachment of the pipetting tip to the coupling establishes an electrical connection between the pressure tube and the pipetting tip;
   an ejection spring arranged at an end portion of the shield distal from the pipetting tip, wherein the shield is movable to exert an ejection force on the pipetting tip via the ejection spring; and
   an electric circuit electrically coupled to the pressure tube and, via the ejection spring, to the shield,
   wherein the electric circuit is configured to apply a time-variable electrical signal to the pressure tube, said time-variable electrical signal enabling capacitive detection of a contact between the pipetting tip and a pipetting liquid when the pipetting tip is attached, and wherein the electric circuit is configured to connect the shield to ground via the ejection spring.

2. The pipetting unit according to claim 1, wherein the time-variable electrical signal is a periodic signal.

3. The pipetting unit according to claim 1, wherein the electric circuit is configured to determine a resonant frequency of a portion of the pipetting unit and the pipetting tip that is excited when the time-variable electrical signal is applied.

4. The pipetting unit according to claim 3, wherein the electric circuit is configured to repeatedly or continuously apply the time-variable electrical signal to the pressure tube and to detect the contact between the pipetting tip and the pipetting liquid on the basis of a change in the resonant frequency.

5. The pipetting unit according to claim 1, wherein the electric circuit is configured to receive a time course of an electrical variable at the pressure tube and to detect a contact between the pipetting tip and the pipetting liquid from the time course of the electrical variable at the pressure tube.

6. The pipetting unit according to claim 5, wherein the electric circuit is configured to analyze the time course of the electrical variable with respect to at least one of amplitude, slope, integral, frequency, and phase, and based thereon, to detect a contact between the pipetting tip and the pipetting liquid.

7. The pipetting unit according to claim 1, wherein the electric circuit comprises at least one of the following features:

the electric circuit is implemented in the form of an integrated circuit component;

the electric circuit is implemented as a circuit with printed conductor paths;

the electric circuit is implemented as a flexprint, in particular as a multilayer flexprint.

8. The pipetting unit according to claim 1, wherein the electric circuit is fixed to the pipetting unit by means of a screw and wherein the electric circuit is coupled to the pressure tube via the screw.

9. The pipetting unit according to claim 8, wherein the electric circuit is coupled to the pressure tube via the screw and a threaded hole or a screw nut.

10. The pipetting unit according to claim 1, wherein the ejection spring is at least arranged coaxially around the pressure tube or is made of steel.

11. The pipetting unit according to claim 1, further comprising an isolator arranged at an end portion of the shield facing the pipetting tip, wherein the isolator is arranged between the shield and at least one of the coupling and an attached pipetting tip.

12. The pipetting unit according to claim 1, wherein the shield is arranged coaxially with respect to the pressure tube.

13. The pipetting unit according to claim 1, wherein the coupling is an active coupling, in particular a solenoid-driven coupling, for fixing or releasing a pipetting tip.

14. The pipetting unit according to claim 1, further comprising a linear motor connected to the pressure tube, wherein a piston is movably arranged in the linear motor and wherein pressure changes in the pressure tube for aspirating or dispensing pipetting liquid are possible by movement of the piston.

15. A pipetting system comprising a plurality of pipetting units, which are each designed according to claim 1, wherein the pipetting system in particular comprises 96 pipetting units, which are each designed according to claim 1.

16. A combination of a pipetting unit and a pipetting tip, comprising:

a pipetting unit according to claim 1; and a conductive pipetting tip attachable to the pipetting unit;

wherein the pipetting tip is a disposable pipetting tip and/or wherein the pipetting tip is made of a conductive polymer material.

17. A method for capacitively detecting pipetting liquid by a pipetting unit, comprising:

applying a time-variable electrical signal to a pressure tube of the pipetting unit, from which the time-variable electrical signal is applied to a pipetting tip via a coupling;

providing a ground connection for a shield of the pipetting unit that is arranged around the pressure tube and that is movably supported relative to the pressure tube, wherein the ground connection for the shield is provided via an ejection spring, which is arranged at an end portion of the shield distal from the pipetting tip, wherein the shield is movable to exert an ejection force on an attached pipetting tip via the ejection spring, wherein the time-variable electrical signal and the ground connection are provided by a common electric circuit; and detecting a contact between the pipetting tip and the pipetting liquid by means of the time-variable electrical signal.

18. A computer program including program instructions which, when executed on a data processing system, effect a method according to claim 17.

\* \* \* \* \*